United States Patent [19]

Nishimura et al.

[11] 4,044,495
[45] Aug. 30, 1977

[54] DEVICE FOR CAPTURING COCKROACHES

[75] Inventors: Akira Nishimura; Hiroshi Akamatsu; Sentaro Negoro, all of Ako; Yasutoshi Yoshida, Kakogawa, all of Japan

[73] Assignee: Earth Chemical Company, Limited, Japan

[21] Appl. No.: 624,190

[22] Filed: Oct. 20, 1975

Related U.S. Application Data

[60] Continuation-in-part of Ser. No. 566,798, April 10, 1975, abandoned, which is a division of Ser. No. 360,021, May 14, 1973, Pat. No. 3,913,259.

[30] Foreign Application Priority Data

| May 26, 1972 | Japan | 47-62290 |
| June 5, 1972 | Japan | 47-66606 |
| June 6, 1972 | Japan | 47-67058 |
| Nov. 21, 1972 | Japan | 47-134736 |
| Nov. 21, 1972 | Japan | 47-117407 |

[51] Int. Cl.² .................. A01M 1/10; A01M 1/14
[52] U.S. Cl. ........................................ 43/121; 43/114
[58] Field of Search ............... 43/121, 114, 131, 115, 43/107, 132, 64, 65; 229/22; D22/19, 18, 21

[56] References Cited

U.S. PATENT DOCUMENTS

| 850,123 | 4/1907 | Algate | 43/65 |
| 1,209,993 | 12/1916 | Oettinger | 43/121 |
| 1,485,867 | 3/1924 | Mooney | 43/121 |
| 2,796,696 | 6/1957 | Kea | 43/121 |
| 3,269,052 | 8/1966 | Barnhart | 43/131 |
| 3,908,302 | 9/1975 | Carr | 43/121 |

*Primary Examiner*—Warner H. Camp
*Attorney, Agent, or Firm*—Armstrong, Nikaido & Marmelstein

[57] ABSTRACT

A device for use in capturing cockroaches which comprises a container having at least one opening or entrance permitting cockroaches to enter therein and a slanting stepping plate extending inwardly upward from the bottom of the opening.

11 Claims, 7 Drawing Figures

DEVICE FOR CAPTURING COCKROACHES

The present application is a continuation-in-part application of Ser. No. 566,798 filed Apr. 10, 1975, which is now abandoned, which in turn is a divisional application of Ser. No. 360,021 filed May 14, 1973 which is now issued as U.S. Pat. No. 3,913,259.

This invention relates to a device for capturing cockroaches and, more particularly to a device for capturing cockroaches when used in combination with a sticky composition.

Conventionally, various methods and devices have been provided for controlling cockroaches which are noxious to man and animals, but since cockroaches are brisk and very alert with a highly developed tactile sense, an effective method for controlling them has not been made available. For instance, although it has generally been practiced to apply an insecticide to the walking area of cockroaches to kill them when they come into contact with the insecticide while walking, this method has the problem that the chemical used is toxic to man and animals, which poses various restrictions on its application such as limitations on the amount and area of application. Moreover, this method is not fully satisfactory in its insecticidal effects. Accordingly, various devices have been proposed to trap cockroaches, e.g., a device provided with a barrier that can be opened in only one direction and a device having a plate rotatable by the weight of the cockroach, but with these devices it is still difficult to achieve efficiency in capturing the cockroaches inasmuch as they are inherently very cautious and they feel their way along to assure safety. Further, it is difficult to capture small cockroaches. In addition, these devices have the drawback that the cockroaches, once captured, will often escape therefrom.

We have carried out extensive research focusing our attention on a novel concept to capture cockroaches with a particular device which may be used in combination with a sticky composition. However, we found it very difficult to capture cockroaches using a sticky composition since cockroaches are alert and have the habit of feeling their way along with their forelegs and antennae and they become cautious upon detecting the composition. In fact, even if captured by such composition, most cockroaches move backward with their strong legs, freeing themselves from the composition.

For this reason, devices are still unavailable which are capable of effectively capturing cockroaches.

An object of this invention is to provide a device for effectively capturing cockroaches of varying sizes when used in combination with a sticky composition by utilizing the habits of cockroaches.

Another object of this invention is to provide a device for capturing cockroaches which is disposable so that the cockroaches captured can be disposed of easily and sanitarily.

These and other objects will become more apparent from the following description.

The device for capturing cockroaches according to this invention comprises a container having at least one opening or entrance permitting cockroaches to enter therein and a slanting stepping plate extending inwardly upward from the bottom of the opening. The container may be used in combination with a sticky composition which is applied to at least the bottom surface of the container.

Generally, the cockroach capturing device of this invention is used with the interior bottom surface coated with a sticky composition for capturing cockroaches. The device is positioned at a place to be infested with cockroaches in such a manner that the coating layer of the sticky composition is exposed to the passage of cockroaches.

The cockroach capturing device of this invention is characterized in that it is in the form of a container. Cockroaches, having the habit of hiding themselves, are induced to enter the device, since it is of the container-type having a covered interior.

Secondly, the present device is characterized in that the container has a slanting stepping plate extending inwardly upward from the bottom of an entrance at its opening. The slanting stepping plate serves to prevent cockroaches from becoming cautious when entering the container and also to prevent them from escaping from the interior of container after they have been captured.

The device of this invention captures cockroaches very efficiently utilizing the habit of cockroaches and, once captured, cockroaches are in no way allowed to escape. Thus the device achieves very high capturing efficiency.

In the device of the invention the container has at least one opening or entrance which permits cockroaches to enter. The container has a roof which covers the interior and stepping plate thereof, and may be in various forms such as, for example, tubular and box-like forms. When desired, the container may be of the knockdown type. The container is made of any material such as metal, plastic, wood, paper and the like, and when made of an inflammable material such as wood or paper, it can be burned and is, accordingly, advantageous to dispose of after use.

The container has at least one opening for the entrance of cockroaches. The number, size and shape of the openings for entrances are determined suitably in conformity with the shape of container. The opening for the entrance of the container may be provided with eaves, which cover the entrance and preferably also the stepping plate to lure cockroaches into the interior more effectively. Since cockroaches prefer to enter an enclosed or covered area, the eaves of the device provide the feeling of such an area.

The entrance formed in the container is provided with a slanting stepping area extending inwardly upward from the bottom of the entrance. The stepping plate substantially eliminates cockroaches from being cautious when entering the container, since they will be above the sticky composition, and also prevents them from escaping from its interior. The height of the elevated edge of the stepping plate should be the equivalent to about one half to twice the body length of the cockroach to achieve satisfactory results. Usually it should be about 3 to about 30 mm. The stepping plate is preferably inclined inward and upward to enable cockroaches to crawl up the stepping plate easily. Advantageously, the angle of inclination should be from about 20° to 60° and preferably from about 30° to 45°. The stepping plate may have a rough-surface such as provided by perforations.

To facilitate the entrance of small cockroaches into the container, the stepping plate itself may have passages formed therein for small cockroaches. The small passages are formed in the lower end, middle portion or upper end of the stepping plate in various shapes such as a polygonal or semicircular shape or a downwardly tapered notch.

The bottom plate of the container need not necessarily be made integral with the main body of container but may be rendered removable from the container main body. Therefore, the bottom plate of the container may be directly coated with a sticky composition or the composition may be applied to a suitable removable carrying member, and the carrying member may then be placed on the bottom plate of the container. Thus, in the latter case, the carrying member serves as the bottom surface of the container and the removable carrying member alone can be replaced by new members and the container may be used repeatedly.

In combination with the device of this invention, any sticky composition may be used as far as it is capable of capturing cockroaches with its stickness. The sticky composition preferably used in combination with the present invention is disclosed in our copending application Ser. No. 566,798, which comprises a mixture of softener and tackifying resin in the weight ratio of 3 – 9 : 7 – 1 and 0 to 10% by weight of rubber, based on the total weight of said mixture and said rubber. The above composition preferably has a viscosity of 40 to 2,100 poises at 25° C and the properties of up to 50 cm in terms of the result of a steel ball rolling test conducted at an angle of inclination of 30° by using a steel ball of 11 mm in diameter and 5.40 g in weight and up to 5 cm in terms of the result of a plastic ball rolling test conducted at an angle of inclination of 30° by using a plastic ball of 14 mm in diameter and 1.3 g in weight.

To improve the composition for capturing efficiency, additives such as baits, attractants, etc. may be used together with the sticky composition as by mixing the additives with the composition, spraying the additives onto the surface of the sticky layer or placing the same in a cavity formed in the sticky layer.

The features of this invention will become more apparent from the detailed description to follow given with reference to the accompanying drawings, in which.

Figure 1:
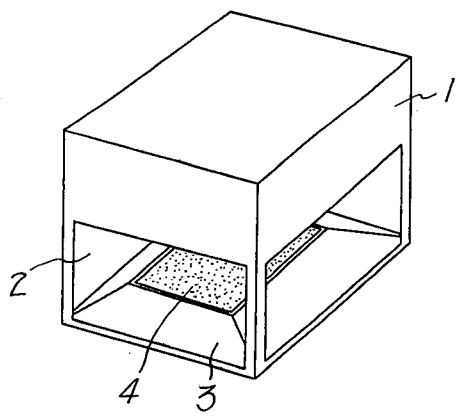
FIGS. 1 to 4 show the most basic embodiments of this invention, FIG. 1 being a perspective view, FIG. 2 being a view in vertical section taken along the longitudinal center line of the embodiment of FIG. 1, FIG. 3 and FIG. 4 being views showing similar devices with coarse-surfaced stepping plates formed with small entrances.
Figure 2:
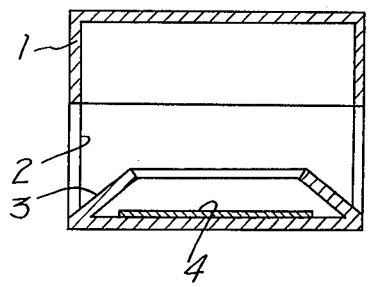

The device shown in FIGS. 1 to 4 comprises a composition-carrying means in the form of cubic container. It has openings 2 which permit the entrance of cockroaches and stepping plates 3 extending inwardly upward from the bottoms of the entrances at the openings 2. The interior bottom plate of container 1 is suitable for applying a coating layer 4. The device may be positioned at a place which is infested with cockroaches in such a manner that the coating layer 4 of the sticky composition is exposed to the passage of cockroaches. The device is in the form of a container. Since cockroaches have the habit of hiding themselves in enclosed or covered areas, they are induced to enter the device, since it is of the container type having a covered interior. Further, with the particular stepping plate 3 provided in the entrance, cockroaches will not become overly cautious when entering the container 1. Without the particular stepping plate 3 at the entrance 2, the cockroaches would become too cautious and possibly detect the presence of the coating layer 4 on the bottom of container with their forelegs or antennae when entering the container 1. The stepping plate 3 disposed at the entrance 2 provides a space between the top of the stepping plate 3 and the coating layer 4 on the inner bottom surface of the container, so that the cockroach fails to detect the presence of coating layer 4 with its forelegs or antennae. Consequently, the cockroach reaches the top of the stepping plate 3 without becoming aware of the coating composition.

Any cockroach on the top of the stepping plate 3 would then move over the edge of the stepping plate 3 onto the bottom plate head first, whereupon its forelegs and antennae are caught by the coating layer 4. Since it is difficult for cockroaches to retreat in such a downwardly inclined position, it is obliged to move forward and is completely captured by the sticky layer.

If the entrance is not equipped with the particular inclined stepping plate, the cockroaches can easily move backward with their strong leg power after initially contacting the sticky layer and manage to free themselves, even if the forelegs or antennae are adhered to the sticky layer, whereas when it is captured in a downwardly inclined position, as in the present device, it can no longer escape from the interior of the container. In this way, cockroaches of varying sizes can be captured in the device according to this invention.

The particular container according to this invention is constructed to induce cockroaches to crawl in by ingeniously utilizing the habit of cockroaches to hide themselves, by providing the stepping plate 3 which serves to prevent cockroaches from becoming overly cautious when entering. Once trapped in the container, cockroaches are captured by the coating layer 4 on the inner bottom surface and escape is prevented by the stepping plate 3. As a whole, the device can capture cockroaches very effectively.

The captured cockroaches as described above are promptly exhausted and die, and accordingly, there is no need to impart toxicity to the coating layer 4. The cockroach capturing device of this invention is, therefore, harmless to man and animals and is usable without any restriction.

Figure 3:
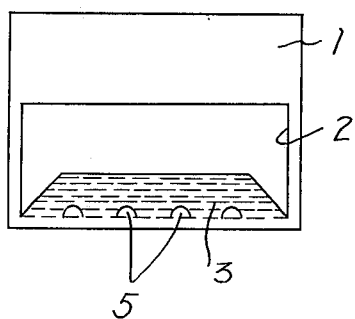
Figure 4:
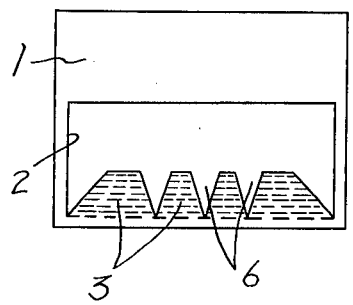

To avoid the possibility of the stepping plate 3 serving as a barrier against small cockroaches such as a very small larva of roaches and *Blattela germanica Linne*, the stepping plate 3 may preferably be formed with small passages 5, 6 as seen in FIGS. 3 and 4.

Illustrated as the passages 5 in the embodiment of the FIG. 3 are semicircular passages as seen from the front and passages 6 in the embodiment of the FIG. 4 are V-shaped notches as seen from the front. The lower end of the V-shaped passages 6 are too narrow for any cockroach to pass through regardless of its size. Accordingly, when passing through the passage 6, the cockroach must pass the particular portion of the passage having a width in conformity with its body size. It therefore follows that the larger the body size, the higher will be the level at which the cockroach passes through the passage 6. Thus, the V-shaped passage 6 does not permit the cockroach to enter straight into the container but always obliges it to step up over the passage 6 and avoids immediate contact with the sticky layer. The passage 6 therefore achieves the same effect on the cockroach as the stepping plate 3.

Figure 5:
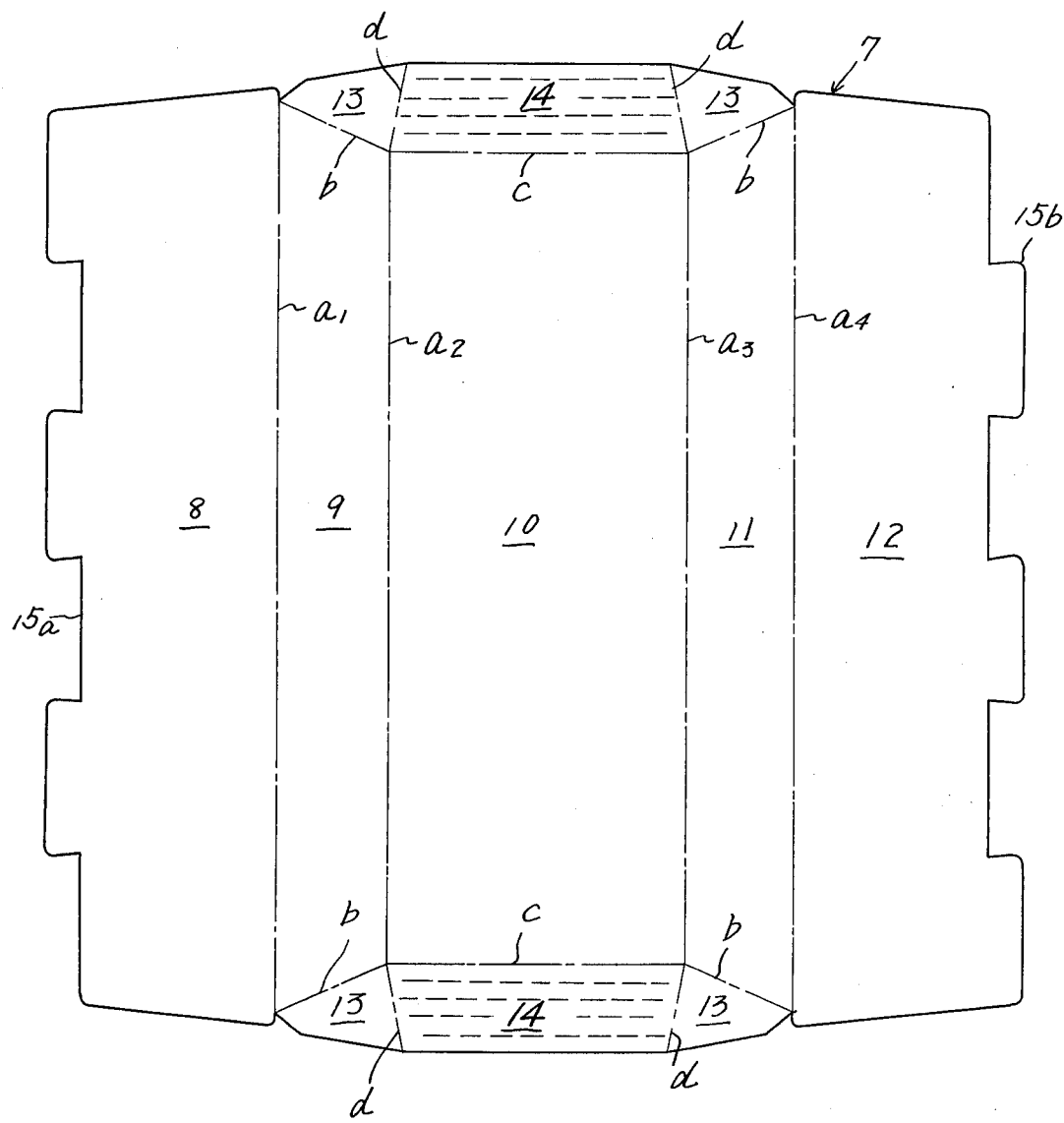
FIGS. 5 to 7 show embodiments of the knockdown type device according to this invention, FIG. 5 being a plan view, FIG. 6 being a perspective view, FIG. 7 being a front view in cross section.
Figure 6:
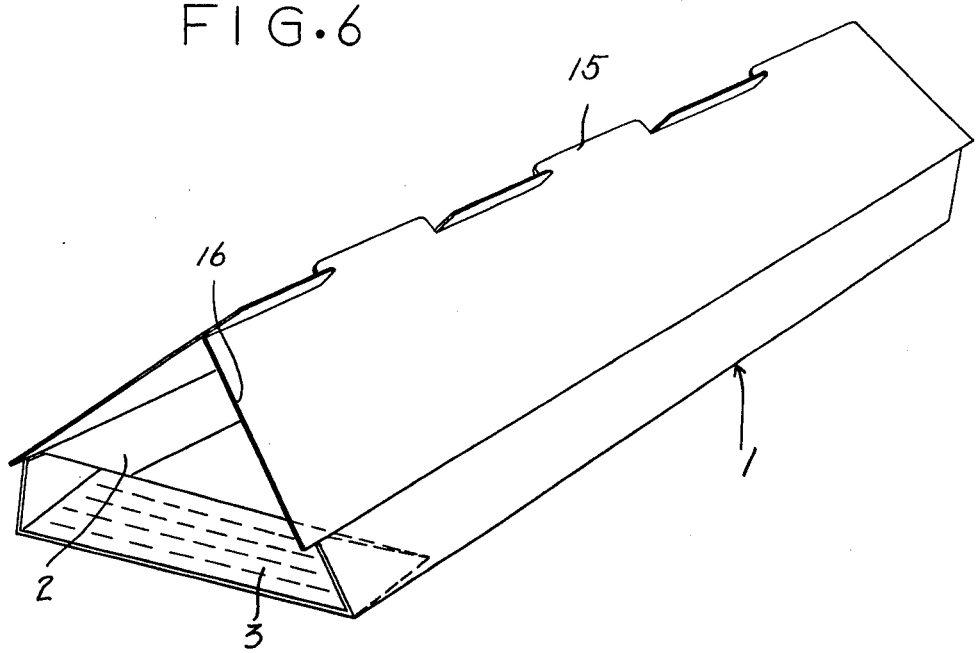
Figure 7:
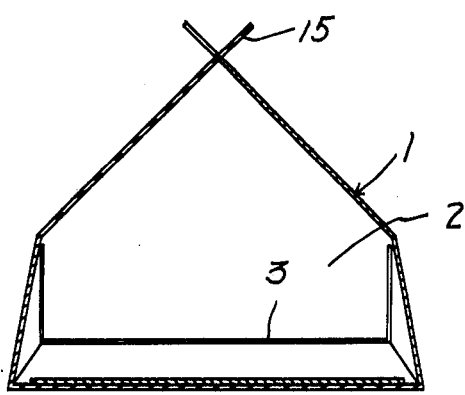

FIGS. 5 to 7 show another embodiment of this invention which can be readiy formed from a flat sheet of paper or cardboard 7 and subsequently assembled.

With reference to the embodiment of this type, the formed sheet 7 includes a left upper plate 8, a left side plate 9, a bottom plate 10, a right side plate 11 and a right upper plate 12 extending continuously with folds $a_1$, $a_2$, $a_3$ and $a_4$ formed between the adjacent plates, support plates 13 extending from the opposite ends of the left and right side plates 9 and 11 with oblique folds $b$ formed therebetween, and stepping plates 14 extending from the opposite ends of the bottom plate 10 with folds $c$ formed therebetween. Each of the stepping plates 14 is continuous at its left and right sides with the support plates 13, with folds $d$ formed therebetween. The left side of the left upper plate 8 and the right side of the right upper plate 12 provide a joining means 15, which in the illustrated embodiment comprises recess 15a and tab 15b meshable with each other. The joining means 15 may be of any construction insofar as plates 8 and 10 can be joined together. For example, plate 12 may be formed with an inserting tab engageable into a receiving slot formed in plate 8.

To assemble the embodiment from the formed sheet 7, the support plates 13 and stepping plates 14 are bent upward along the folds $b$ and $c$, the left and right side plates 9, 11 and left and right upper plates 8, 12 are then bent upward along each of the folds $a_1$ through $a_4$, and the ends of the left and right upper plates 8, 12 are thereafter joined together to form joining means 15. In this way a tunnel-like cockroach capturing device is assembled as seen in FIG. 6 which has upwardly slanting stepping plates 3 provided by the stepping plates 14 at the lower ends of openings 2 and eaves 16 formed at the upper ends of the openings 2 by the inwardly slanting stepping plates 14 and support plates 13.

According to the embodiment of the fourth type, the angle of inclination of the stepping plate 3 may be adjusted as desired by varying the angle of inclination of the folds $d$ with respect to the folds $b$.

The cockroach capturing device of the knockdown type described can be stored and transported in a flat unfolded shape before it is put to use and is therefore advantageus in saving the space for storage and transport. The device of this type has another advantage in that a sticky composition may be applied to the bottom plate 10 thereof with ease, since this may be done before the formed sheet is folded to shape for use. The cockroach capturing device of this type, when assembled, has the stepping plate 3 and eaves 16 at the entrance 2, making it possible to capture cockroaches very effectively as in the case of the foregoing embodiments. Particularly, the eaves 16 provide a cover over the entrance and stepping plate, which in turn provides cockroaches with a feeling they are entering a closed area which they prefer. The design and structure of the device of the invention provides a capturing device which utilizes the habits of cockroaches and results in their efficient capture.

What we claim is:

1. A device for capturing cockroaches comprising:
a rectangular base member,
two side means, extending from opposite side edges of said base member, said side means meeting along a line parallel to said opposite side edges of said base member to form a housing;
at least one stepping plate extending from said base along an end edge thereof, said stepping plate being inclined inwardly into said housing;
wherein an opening directly into said housing is formed at at least one end of said housing, said opening being defined by said stepping plate and said side means; and
wherein said stepping plate serves to prevent cockroaches from escaping from the interior of the housing after they have been captured.

2. The device of claim 1 wherein the stepping plate has an inner edge which is about 3 mm to about 30 mm above the bottom plate.

3. The device of claim 1 wherein the stepping plate has an angle of inclination of from about 20° to about 60°.

4. The device of claim 1 wherein the stepping plate has an angle of inclination of from about 30° to about 45°.

5. The device for capturing cockroaches according to claim 1, wherein the opening for cockroaches is provided with eaves.

6. The device of claim 1 wherein said stepping plate is integral with said base member.

7. A device for capturing cockroaches which is a container of the knockdown type which comprises a left upper plate, a left side plate, a bottom plate, a right side plate and a right upper plate extending continuously with folds formed between the adjacent plates, support plates extending from the opposite ends of the left and right side plates with oblique inward folds formed therebetween, and stepping plates extending from the opposite ends of the bottom plate with horizontal folds formed therebetween, each of the stepping plates being continuous at its left and right sides with the support plates with vertical folds formed therebetween, the left side of the left upper plate and the right side of the right upper plate having joining means respectively to join both the upper plates together wherein when assembled said device comprises said bottom plate; said right side plate and said left side plate, extending from opposite side edges of said bottom plate and said right upper plate extending from said right side plate and said left upper plate extending from said left side plate to form a housing; said stepping plates extending from said bottom plate along an end edge thereof, said stepping plates being inclined inwardly into said housing; wherein an opening is formed at at least one end of said housing, said opening being defined by said stepping plate, said right side plate, said right upper plate, said left upper plate, and said left side plate; and wherein said stepping plate serves to prevent cockroaches from escaping from the interior of the housing after they have been captured.

8. The device of claim 7 wherein the stepping plate has an inner edge which is about 3 mm to about 30 mm above the bottom plate.

9. The device of claim 7 wherein the stepping plate has an angle of inclination of from about 20° to about 60°.

10. The device of claim 7 wherein the stepping plate has an angle of inclination of from about 30° to about 45°.

11. The device of claim 7 wherein the left and right upper plates are constructed to form eaves over the stepping plates.

* * * * *